United States Patent
Metzger et al.

(10) Patent No.: US 6,765,915 B1
(45) Date of Patent: Jul. 20, 2004

(54) PACKET COMMUNICATION SCHEDULING WITH HIERARCHICAL TUNNELS

(75) Inventors: Michael M. Metzger, Boulder, CO (US); Jeffrey R. Gemar, Superior, CO (US); Uve W. Rick, Broomfield, CO (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/578,967

(22) Filed: May 25, 2000

(51) Int. Cl.[7] ............................................... H04L 12/56
(52) U.S. Cl. .................................................. 370/395.43
(58) Field of Search ................................ 370/229, 230, 370/230.1, 231, 235, 236, 236.1, 395.1, 395.4, 395.41, 395.42, 395.43, 468, 474

(56) References Cited

U.S. PATENT DOCUMENTS

| | | | | |
|---|---|---|---|---|
| 5,689,499 A | * | 11/1997 | Hullett et al. | 370/235 |
| 5,987,031 A | * | 11/1999 | Miller et al. | 370/412 |
| 6,262,989 B1 | * | 7/2001 | Gemar et al. | 370/412 |
| 6,272,109 B1 | * | 8/2001 | Pei et al. | 370/230 |
| 6,359,891 B1 | * | 3/2002 | Bergantino et al. | 370/398 |
| 6,430,156 B1 | * | 8/2002 | Park et al. | 370/232 |
| 6,459,681 B1 | * | 10/2002 | Oliva | 370/232 |
| 6,507,577 B1 | * | 1/2003 | Mauger et al. | 370/356 |
| 6,532,213 B1 | * | 3/2003 | Chiussi et al. | 370/230.1 |

* cited by examiner

Primary Examiner—Kwang Bin Yao
(74) Attorney, Agent, or Firm—Keith Kind (57) ABSTRACT

A packet communication scheduling system comprises tunnel schedulers, a packet scheduler, and a rate controller. The packet scheduler generates a packet schedule and first-set information in response to packet information. The first tunnel scheduler generates a first schedule for a first set of tunnels in response to the first-set information. The first tunnel scheduler also generates second-set information in response to the first-set information. The second tunnel scheduler generates a second schedule for a second set of tunnels in response to the second-set information. The second tunnel scheduler also generates third-set information in response to the second-set information. The third tunnel scheduler generates a third schedule for a third set of tunnels in response to the third-set information. The third tunnel scheduler selects a next third-set tunnel identifier based on the third schedule. The second tunnel scheduler selects a next second-set tunnel identifier based on the second schedule and the next third-set tunnel identifier. The first tunnel scheduler selects a next first-set tunnel identifier based on the first schedule and the next second-set tunnel identifier. The packet scheduler selects a next packet identifier for a next packet transmission based on the next first-set tunnel identifier and the packet schedule.

20 Claims, 5 Drawing Sheets

PACKET COMMUNICATION SCHEDULING WITH HIERARCHICAL TUNNELS

BACKGROUND OF THE INVENTION

1. Field of the Invention

The invention is related to the field of communication systems, and in particular, to a packet scheduling system that schedules packet transmission according to a hierarchy of tunnels.

2. Statement of the Problem

A packet communication system transfers packets within data streams between customer sites. The packets contain information, such as voice, video, and data. The data streams are often grouped into data tunnels to simplify management. Thus, a data tunnel is a group of data streams that flow between two customer sites. For example, a business with offices in San Francisco and New York may have a data tunnel between San Francisco and New York that includes a group of data streams. The data streams are distinguished from one another by identifiers in the packets.

The packet communication system uses various service classes to define the data streams within the tunnel. For Asynchronous Transfer Mode (ATM) communications, service classes have been defined for Constant Bit Rate (CBR), Variable Bit Rate (VBR), Available Bit Rate (ABR), Unspecified Bit Rate (UBR), and Guaranteed Flat Rate (GFR). The service class for a data stream is typically selected based on the type of data being transferred.

The packet communication system uses a scheduling system to determine when to transfer packets for the respective data streams within the tunnel. Packet scheduling is primarily based on service class. For example, a CBR data stream typically gets priority scheduling over an ABR bit stream.

Currently, CBR tunnels are available that carry CBR, VBR, ABR, GFR, and UBR data streams. Unfortunately, CBR tunnels can be inefficient or costly because constant bandwidth is allocated to the tunnel and may go unused. In addition, multiple tunnels with different service classes require a scheduling system for the tunnels in addition to the data streams. Current tunnel scheduling systems combine tunnel and data stream scheduling into a single scheduling table. The single scheduling table precludes complex scheduling and is not scalable.

A scheduling system is needed that supports tunnels that comprise multiple service classes. The scheduling system should allow for complex and hierarchical scheduling. The scheduling system should be scalable.

SUMMARY OF THE SOLUTION

The invention solves the above problems with a packet scheduling system for a packet communication network. The packet scheduling system supports tunnels that use multiple service classes, such as CBR, VBR, ABR, GFR, and UBR. Advantageously, the bit rate of the tunnels may vary dynamically to optimize bandwidth utilization. The packet scheduling-system allows for a hierarchical scheduling arrangement among multiple tunnels.

In some embodiments of the invention, a packet communication scheduling system comprises three tunnel schedulers, a packet scheduler, and a rate controller. The packet scheduler generates a packet schedule and first-set information in response to packet information. The first tunnel scheduler generates a first schedule for a first set of tunnels in response to the first-set information. The first tunnel scheduler also generates second-set information in response to the first-set information. The second tunnel scheduler generates a second schedule for a second set of tunnels in response to the second-set information. The second tunnel scheduler also generates third-set information in response to the second-set information. The third tunnel scheduler generates a third schedule for a third set of tunnels in response to the third-set information. The feedback loop rate controller receives and distributes packet system feedback information. The tunnel schedulers also generate their respective schedules in response to the packet system feedback information.

The third tunnel scheduler selects a next third-set tunnel identifier based on the third schedule. The second tunnel scheduler selects a next second-set tunnel identifier based on the second schedule and the next third-set tunnel identifier. The first tunnel scheduler selects a next first-set tunnel identifier based on the first schedule and the next second-set tunnel identifier. The packet scheduler selects a next packet identifier for a next packet transmission based on the next first-set tunnel identifier and the packet schedule.

DETAILED DESCRIPTION OF THE INVENTION

Figure 1:
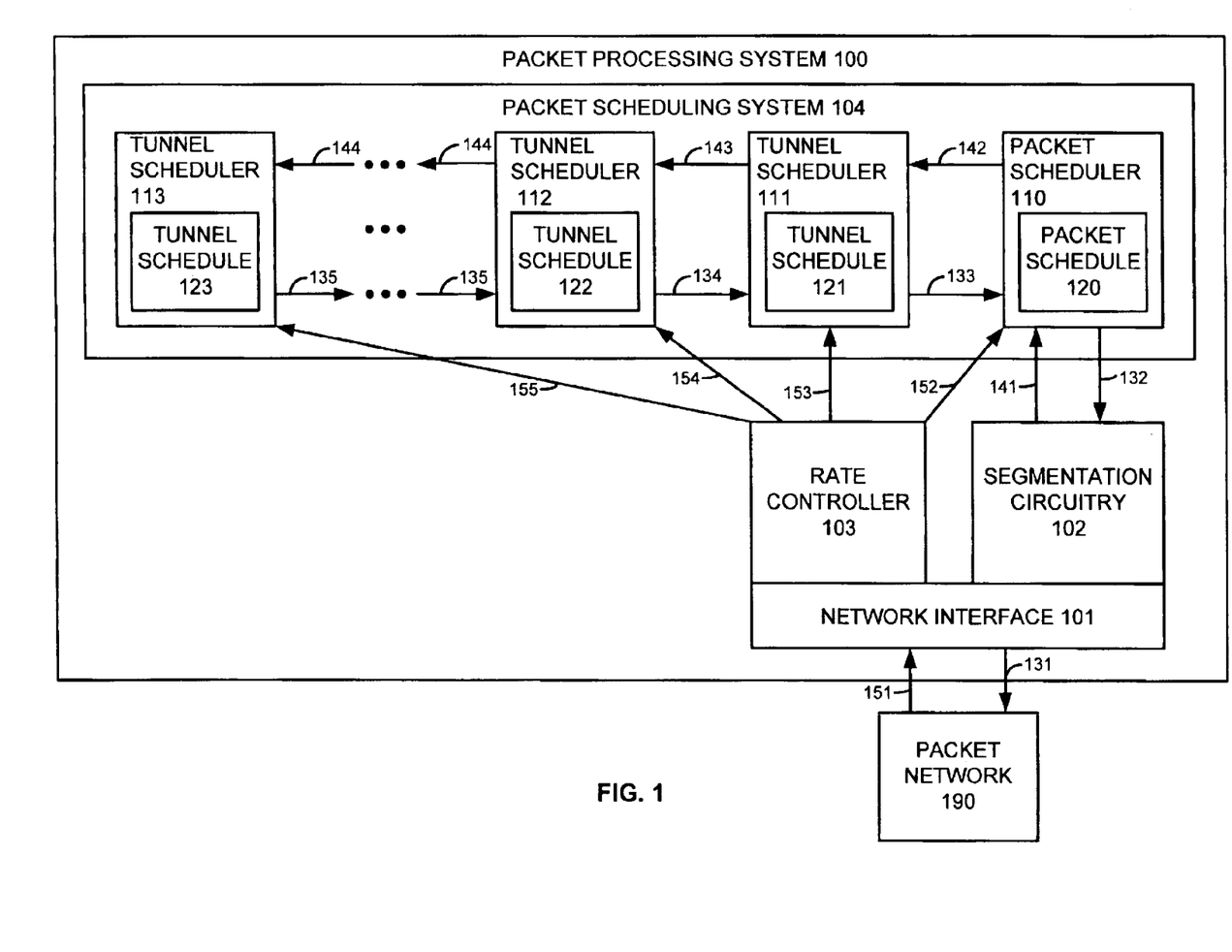
FIG. 1 is a block diagram that illustrates a packet processing system in an example of the invention.

Packet Processing System—FIG. 1

FIG. 1 depicts a specific example of a packet processing system in accord with the present invention. Those skilled in the art will appreciate numerous variations from this example that do not depart from the scope of the invention. Those skilled in the art will appreciate that various features described below could be combined with other embodiments to form multiple variations of the invention. Those skilled in the art will also appreciate that some conventional aspects of FIG. 1 have been simplified or omitted for clarity.

FIG. 1 is a block diagram that illustrates packet processing system 100 in an example of the invention. Packet processing system 100 transfers packets 131 to packet network 190 and receives packet network feedback 151 from packet network 190. Packet processing system 100 is configured to schedule packet transmission for tunnels. The tunnels could be CBR, VBR, UBR, ABR, GFR, or some other type of tunnel. The tunnel scheduling can be based on a tunnel scheduling hierarchy.

Packet processing system 100 is comprised of network interface 101, segmentation circuitry 102, rate controller 103, and packet scheduling system 104. Packet scheduling system 104 is comprised of packet scheduler 110 with packet schedule 120 and tunnel schedulers 111–113 with respective tunnel schedules 121–123. The above components of packet processing system 100 are comprised of integrated circuitry and processing instructions. The packets could be ATM cells, ATM AAL CPS packets, Internet packets, or some other packet format.

Packet scheduling system 104 transfers next packet identifiers (IDs) 132 to segmentation circuitry 102. Segmentation circuitry 102 transfers packets 131 to packet network 190 based on next packet identifiers 132. Segmentation circuitry 102 transfers packet information 141 to packet scheduler 110. Packet information 141 indicates new packet IDs, new tunnel IDs, and packet transfer results. In some examples of the invention, packet and tunnel IDs are ATM virtual connection IDs.

Packet scheduler 110 generates packet schedule 120 in response to packet information 141. Packet scheduler 110 selects next packet IDs 132 based on packet schedule 120 and next tunnel IDs 133 from tunnel scheduler 111. Packet scheduler 110 also transfers tunnel information 142 to tunnel scheduler 111. Tunnel information 142 includes new tunnel IDs and packet transfer results.

Tunnel scheduler 111 generates tunnel schedule 121 for a first set of tunnels in response to tunnel information 142. Tunnel scheduler 111 selects next tunnel IDs 133 based on tunnel schedule 121 and next tunnel IDs 134 from tunnel scheduler 112. Tunnel scheduler 111 also transfers tunnel information 143 to tunnel scheduler 112. Tunnel information 143 includes new tunnel IDs and packet transfer results.

Tunnel scheduler 112 generates tunnel schedule 122 for a second set of tunnels in response to tunnel information 143. Tunnel scheduler 112 selects next tunnel IDs 134 based on tunnel schedule 122 and next tunnel IDs 135. Tunnel scheduler 112 also transfers tunnel information 144. Tunnel information 144 includes new tunnel IDs and packet transfer results.

The ellipses signify that additional tunnel schedulers may be positioned between tunnel schedulers 112–113 if desired, but the following description assumes that no additional tunnel schedulers have been inserted. Tunnel scheduler 113 generates tunnel schedule 123 for a third set of tunnels in response to tunnel information 144. Tunnel scheduler 113 selects next tunnel IDs 135 based on tunnel schedule 123. Tunnel scheduler 113 affects tunnel scheduling for tunnel scheduler 112. Tunnel scheduler 112 affects tunnel scheduling for tunnel scheduler 111. Tunnel scheduler 111 affects packet scheduling for packet scheduler 110. Thus, tunnel scheduler 113 is at the top of a tunnel scheduling hierarchy that controls the next packet IDs 132, and that ultimately controls packets 131 that are transferred to packet network 190.

Although rate controller 103 may be omitted in some examples of the invention, it is desirable if packet network 190 provides feedback 151. Feedback 151 indicates current network status, such as congestion levels and delays. One example of feedback 151 is resource management cells for ATM ABR traffic. Rate controller 103 receives and distributes feedback 151 in the form of feedback 152–155 to respective schedulers 110–113. Schedulers 110–113 generate their respective schedules 120–123 in response to feedback 152–155.

Figure 2:
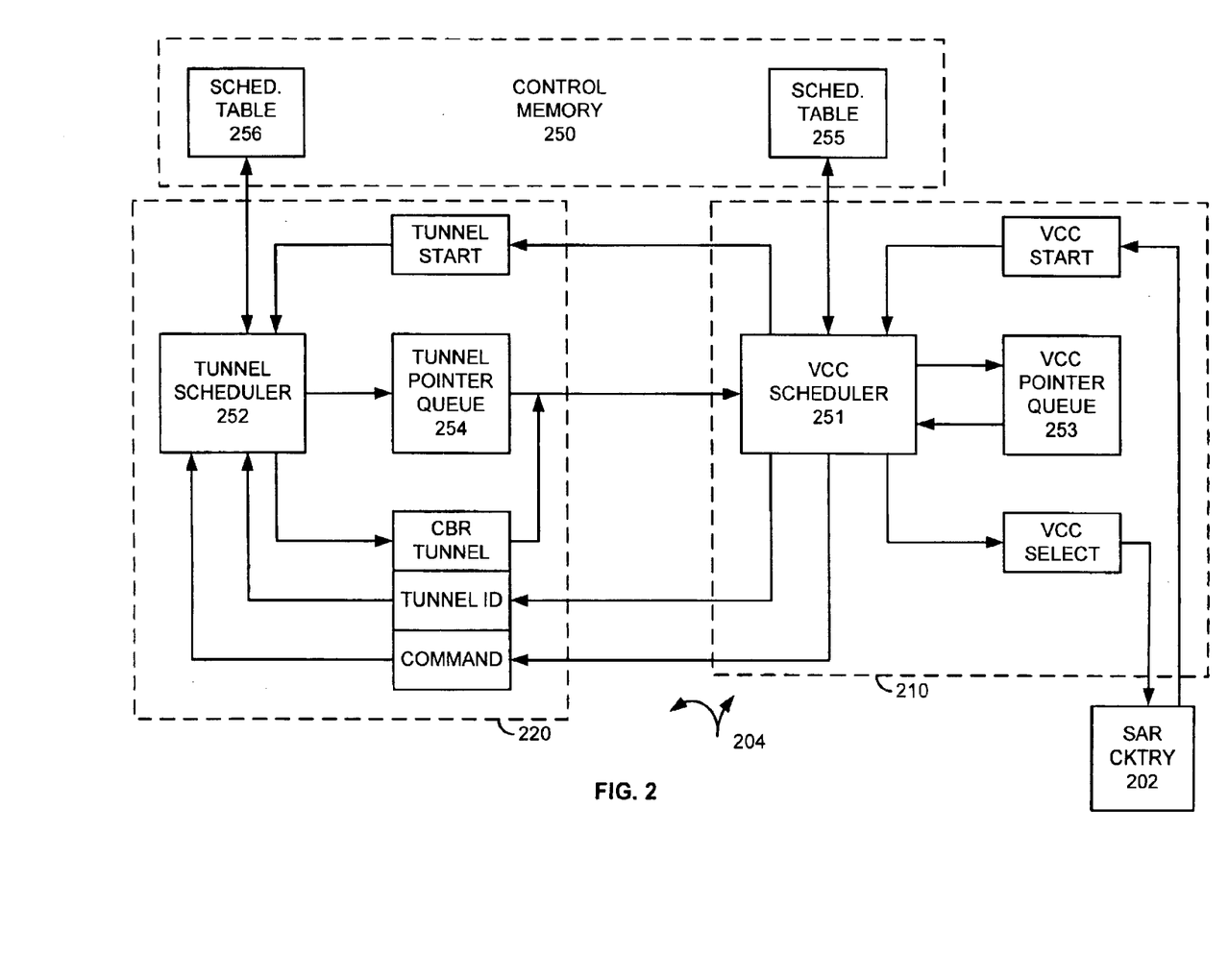
FIG. 2 is a block diagram that illustrates an ATM cell scheduling system in an example of the invention.
Figure 3:
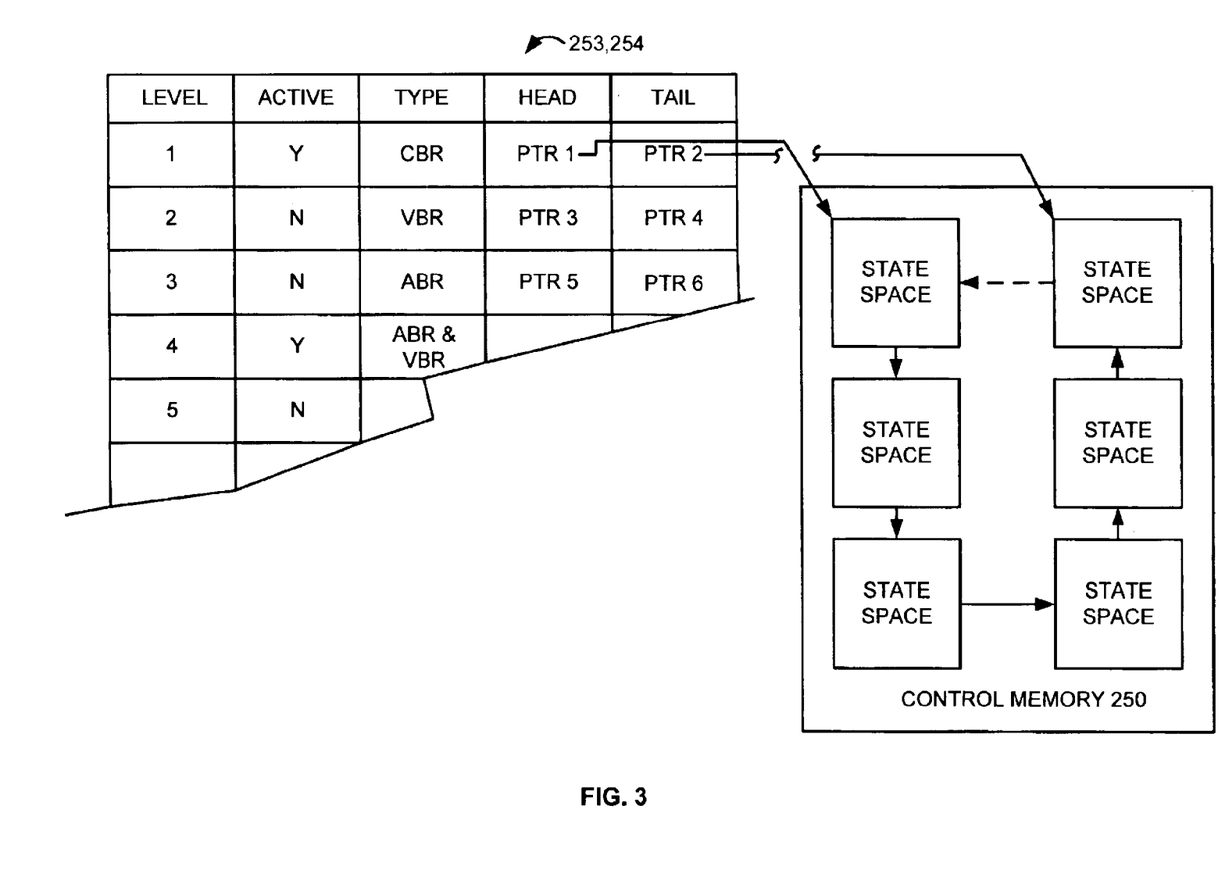
FIG. 3 is a block diagram that illustrates pointer queues in an example of the invention.

ATM Cell Scheduling System—FIGS. 2–3

FIGS. 2–5 depict a specific example of an ATM cell scheduling system in accord with the present invention. Those skilled in the art will appreciate numerous variations from this example that do not depart from the scope of the invention. Those skilled in the art will appreciate that various features described below could be combined with other embodiments to form multiple variations of the invention. Those skilled in the art will also appreciate that some conventional aspects of FIGS. 2–3 have been simplified or omitted for clarity.

FIG. 2 is a block diagram that illustrates ATM cell scheduling system 204 in an example of the invention. ATM cell scheduling system 204 comprises VCC scheduling system 210 and tunnel scheduling system 220. VCC scheduling system 210 comprises VCC scheduler 251, VCC pointer queue 253, VCC start First-In First-Out Memory (FIFO), and VCC select FIFO. Tunnel scheduling system 220 comprises tunnel scheduler 252, tunnel pointer queue 254, tunnel start FIFO, CBR tunnel FIFO, tunnel ID FIFO, and command FIFO. Schedulers 251–252 process respective schedule tables 255–256 that are stored in control memory 250.

FIG. 3 is a block diagram that illustrates pointer queues 253–254 in an example of the invention. VCC pointer queue 253 has multiple priority levels. Each priority level is associated with one or more types of VCCs, such as CBR, VBR, ABR, UBR, and GFR. Each priority level has a bit to indicate if the priority level is active or inactive. Each priority level has a head pointer and a tail pointer. The head pointer and tail pointer define a linked list representing the Virtual Channel Connections (VCCs) that are active at the given priority level. The head pointer points to state space in control memory 250 for the first VCC in the linked list. The tail pointer points to state space in control memory 250 for the last VCC in the linked list. The linked list is circular for some priority levels, such as priority levels that contain UBR VCCs.

Tunnel pointer queue 254 also has multiple priority levels. Each priority level is associated with one or more types of tunnels, such as CBR, VBR, ABR, UBR, and GFR. A null tunnel may also be used for VCCs that are not assigned to a tunnel. Each priority level has a bit to indicate if the priority level is active or inactive. Each priority level has a head pointer and a tail pointer. The head pointer and tail pointer define a linked list representing the tunnels that are active at the given priority level. The head pointer points to state space in control memory 250 for the first tunnel in the linked list. The tail pointer points to state space in control memory 250 for the last tunnel in the linked list. Each tunnel is associated with a corresponding set of VCC pointer queue 253 priority levels, and the state space for each tunnel indicates the association. The linked list is circular for some priority levels, such as priority levels that contain UBR tunnels.

Figure 4:
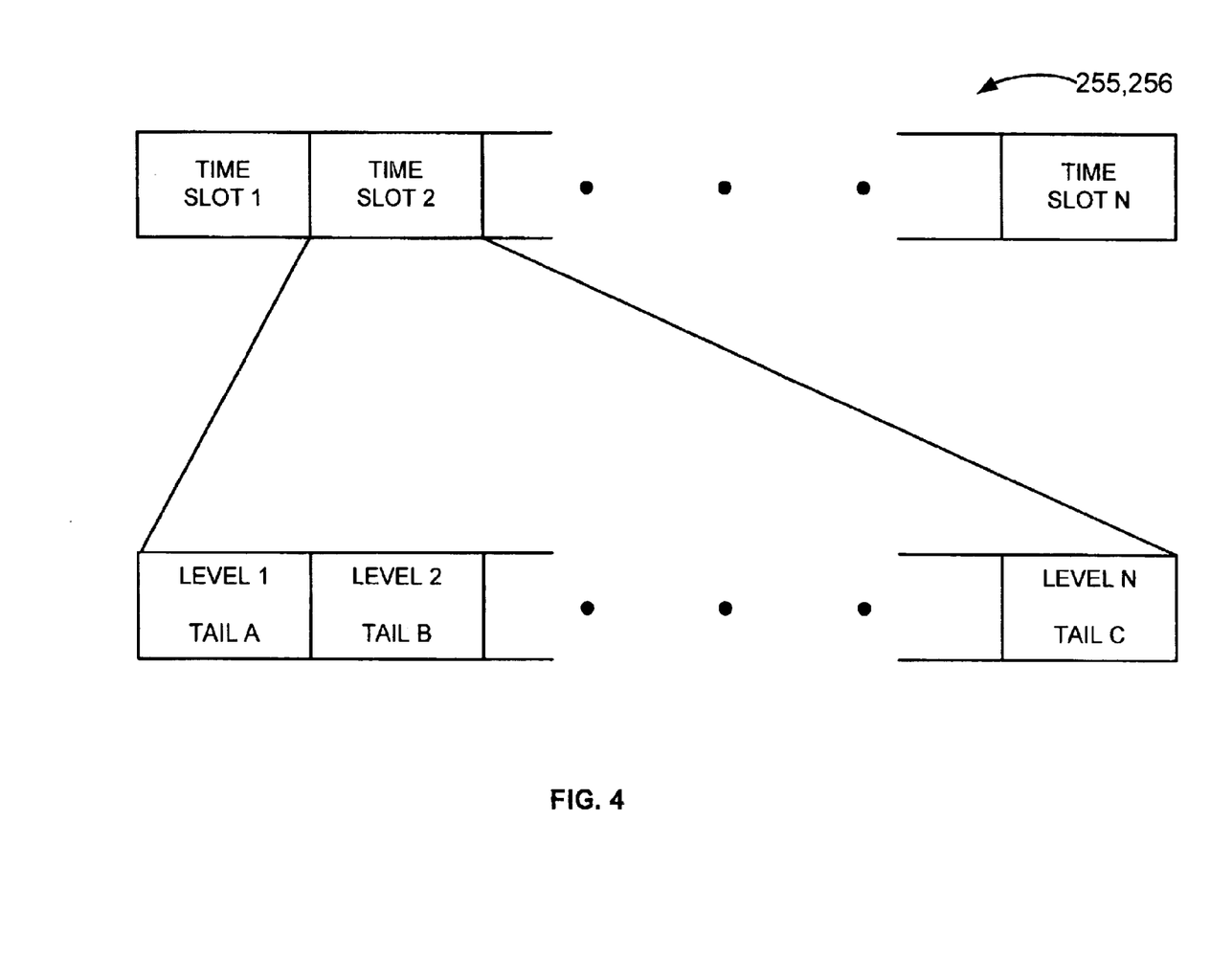
FIG. 4 is a block diagram that illustrates schedule tables in an example of the invention.

FIG. 4 is a block diagram that illustrates schedule tables 255–256 in an example of the invention. VCC schedule table 255 has time slot entries that are processed chronologically by VCC scheduler 251. Each time slot entry has fields for each of the priority levels in VCC pointer queue 253. The fields contain VCC tail pointers for the VCCs that are active for the respective priority level. For example, CBR VCCs are identified in a time slot field that is associated with the top priority level in VCC pointer queue 253. For more efficient memory utilization when VCC schedule table 255 becomes too large, VCC schedule table 255 may be separated into sub-tables with a sub-table for each priority level in VCC pointer queue 253.

Tunnel schedule table 256 has time slot entries that are processed chronologically by tunnel scheduler 252. Each time slot entry has fields for each of the priority levels in tunnel pointer queue 254. The fields contain tunnel tail pointers for the tunnels that are active for the respective priority level. Each time slot entry also contains a field for CBR tunnels.

In operation, SAR circuitry 202 notifies VCC scheduler 251 through the VCC start FIFO when a new VCC or a new tunnel is activated. If a new tunnel is activated, VCC scheduler 251 notifies tunnel scheduler 252 through the tunnel start FIFO. VCC scheduler 251 schedules any new VCCs in VCC schedule table 255, and tunnel <scheduler 252 schedules any new tunnels in tunnel schedule table 256.

VCC scheduler 251 counts the number of active VCCs in each tunnel, and when a tunnel no longer has any active VCCs, VCC scheduler 251 transfers a tunnel ID and a deactivate command respectively to the tunnel ID and command FIFOs. Tunnel scheduler 252 then deactivates the corresponding tunnel.

Tunnel scheduler 252 processes tunnel schedule table 256 to determine which tunnels are active at each priority level for the time slot. Tunnel scheduler 252 adds the tail pointers for active tunnels to pointer queue 254 and adds the CBR VCCs directly to the CBR tunnel FIFO.

VCC scheduler 251 processes the CBR tunnel FIFO to select a tunnel for the next cell transmission. If the CBR tunnel FIFO is empty, then VCC scheduler 251 processes the tunnel pointer queue 254 to select a tunnel from an active priority level for the next cell transmission. Various tunnel queue selection techniques could be used including round robin, pure priority, or a weighted scheme. Since both schedulers 251–252 access tunnel pointer queue 254, an arbitration arrangement is implemented between schedulers 251–252 to control queue access.

VCC scheduler 251 checks the state space for the selected tunnel to determine which priority levels in VCC pointer queue 253 are associated with the selected tunnel. VCC scheduler 251 activates the associated priority levels in VCC pointer queue 253. VCC scheduler 251 then processes VCC pointer queue 253 to select a VCC from an active priority level for the next cell transmission. Various VCC queue selection techniques could be used including round robin, pure priority, or a weighted scheme. VCC scheduler 251 places the selected VCC in the VCC select FIFO. SAR circuitry 202 transfers data over the VCC identified in the VCC select FIFO.

After placing the selected VCC in the VCC select FIFO, VCC scheduler 251 re-schedules the selected VCC in the VCC schedule table 255. VCC scheduler 251 also transfers the tunnel ID for the VCC and a sent command respectively to the tunnel ID FIFO and the command FIFO. Tunnel scheduler 252 re-schedules the tunnel in response to the tunnel ID and sent command in the FIFOs.

If the selected tunnel does not have any VCC pointers in VCC pointer queue 253, then VCC scheduler 251 transfers the tunnel ID and a not-sent command respectively to the tunnel ID FIFO and the command FIFO. Tunnel scheduler 252 re-schedules the tunnel in response to the tunnel ID and not-sent command in the FIFOs.

Figure 5:
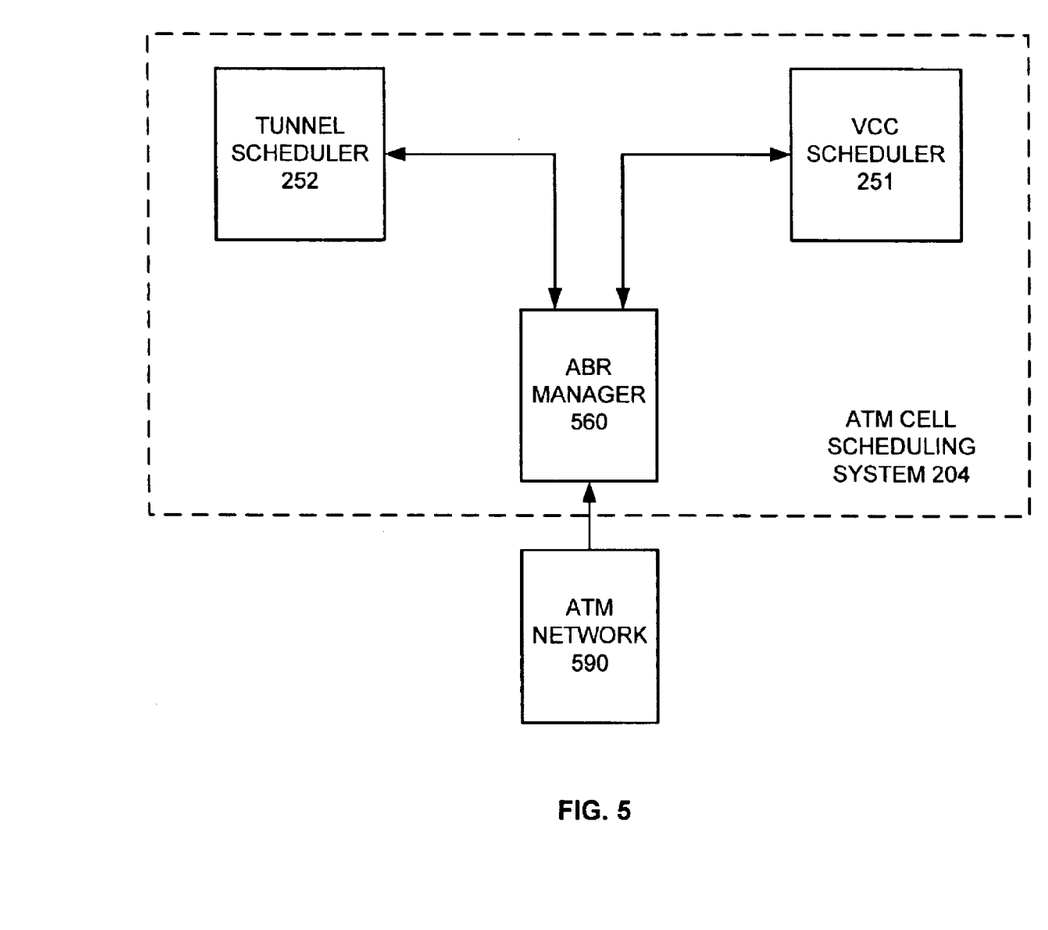
FIG. 5 is a block diagram that illustrates an ATM cell scheduling system with an ABR feedback loop in an example of the invention.

FIG. 5 is a block diagram that illustrates ATM cell scheduling system 204 with an ABR feedback loop in an example of the invention. ABR manager 560 receives ABR resource management cells from ATM network 590. ABR systems using ABR resource management cells to control ABR traffic are well known. ABR resource management for tunnels operates in a similar manner to ABR resource management for VCCs—resource management cells for tunnels would be required. Resource management cells for tunnels would include the associated tunnel ID, which could take the form of a VCC. ABR manager routes 560 the ABR resource management cells to either VCC scheduler 251 or to tunnel scheduler 252 based on whether the given ABR resource management cell relates to an ABR VCC or an ABR tunnel. No ABR tunnel forward resource management cells are generated for a tunnel if no connections are active within the tunnel.

ATM cell scheduling system 204 supports CBR, VBR, UBR, ABR, and GFR tunnels. Advantageously, ATM customers are not restricted to using variable bandwidth data streams within an inefficient CBR tunnel. In addition, a hierarchy of tunnel scheduling is available. Additional tunnel scheduling stages can be established by using the principles described above.

Additional details regarding ATM cell scheduling can be found in U.S. patent application Ser. No. 09/087,238, entitled "Apparatus and Method For Providing Multiple and Simultaneous Quality of Service Connects in a Tunnel Mode", filed on May 29, 1998, and which is hereby incorporated by reference into this patent application. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A packet communication scheduling system:
   a first tunnel scheduler configured to generate a first schedule for a first set of tunnels in response to first-set tunnel information, to select a next first-set tunnel identifier based on the first schedule, and to generate the first schedule for the first set of tunnels in response to the packet system feedback information wherein the first-set tunnel information indicates new first-set tunnels and first-set transmission results, and wherein the first set of tunnels includes a constant bit-rate tunnel, a variable bit rate tunnel, an available bit rate tunnel, an unspecified bit-rate tunnel, and a guaranteed flat rate tunnel;
   a second tunnel scheduler configured to generate a second schedule for a second set of tunnels in response to second-set information and to select a next second-set tunnel identifier based on the second schedule, wherein the second-set information indicates new second-set tunnels and second-set transmission results, and wherein the second set of tunnels includes a constant bit-rate tunnel, a variable bit rate tunnel, an available bit rate tunnel, an unspecified bit-rate tunnel, and a guaranteed flat rate tunnel;
   a packet scheduler configured to generate a packet schedule and the first-set tunnel information in response to packet information, to select a next packet identifier for a next packet transmission based on the next first-set tunnel identifier and the packet schedule, and to generate the packet schedule in response to the packet system feedback information;
   a feedback loop rate controller configured to receive and distribute packet system feedback information, wherein the feedback loop rate controller is configured to process tunnel resource management cells for ABR tunnels and wherein the packet system feedback information is for available bit rate traffic; and wherein
   the first tunnel scheduler is further configured to generate the second-set information in response to the first-set information and to select the next first-set tunnel identifier based on the next second-set tunnel identifier.
   the second tunnel scheduler is further configured to generate the second schedule for the second set of tunnels in response to the packet system feedback information;

the first tunnel scheduler is further configured to generate the first schedule for the first set of tunnels in response to the packet system feedback information; and the packet scheduler is further configured to generate the packet schedule in response to the packet system feedback information.

2. The packet communication scheduling system of claim 1 wherein the packet system feedback information is for available bit rate traffic.

3. The packet communication scheduling system of claim 2 wherein the feedback loop rate controller is configured to process tunnel resource management cells for ABR tunnels.

4. The packet communication scheduling system of claim 1 further comprising:

a third tunnel scheduler configured to generate a third schedule for a third set of tunnels in response to third-set information and to select a next third-set tunnel identifier based on the third schedule; and wherein the second tunnel scheduler is further configured to generate the third-set information in response to the second-set information and to select the next second-set tunnel identifier based on the next third-set tunnel identifier.

5. The packet communication scheduling system of claim 4 wherein the third-set information indicates new third-set tunnels and third-set transmission results.

6. The packet communication scheduling system of claim 4 wherein the third set of tunnels includes a constant bit-rate tunnel, a variable bit rate tunnel, and an available bit rate tunnel.

7. The packet communication scheduling system of claim 6 wherein the third set of tunnels includes an unspecified bit-rate tunnel and a guaranteed flat rate tunnel.

8. The packet communication scheduling system of claim 4 further comprising:

the feedback loop rate controller is configured to receive and distribute packet system feedback information; and wherein the third tunnel scheduler is further configured to generate the third schedule for the third set of tunnels in response to the packet system feedback information;

the second tunnel scheduler is further configured to generate the second schedule for the second set of tunnels in response to the packet system feedback information;

the first tunnel scheduler is further configured to generate the first schedule for the first set of tunnels in response to the packet system feedback information; and the packet scheduler is further configured to generate the packet schedule in response to the packet system feedback information.

9. The packet communication scheduling system of claim 8 wherein the packet system feedback information is for available bit rate traffic.

10. The packet communication scheduling system of claim 9 wherein the feedback loop rate controller is configured to process tunnel resource management cells for ABR tunnels.

11. A method of operating a packet communication scheduling system, the method comprising:

generating a packet schedule and first-set tunnel information in response to packet information;

generating a first schedule for a first set of tunnels in response to the first-set tunnel information, wherein the first set of tunnels includes a constant bit-rate tunnel, a variable bit rate tunnel, an available bit rate tunnel, an unspecified bit-rate tunnel, and a guaranteed flat rate tunnel;

selecting a next first-set tunnel identifier based on the first schedule;

selecting a next packet identifier for a next packet transmission based on the next first-set tunnel identifier and the packet schedule;

generating second-set information in response to the first-set information, wherein the second-set information indicates new second-set tunnels and second-set transmission results;

generating a second schedule for a second set of tunnels in response to the second-set information, wherein the second set of tunnels includes a constant bit-rate tunnel, a variable bit rate tunnel, an available bit rate tunnel, an unspecified bit-rate tunnel, and a guaranteed flat rate tunnel;

selecting a next second-set tunnel identifier based on the second schedule;

receiving and distributing packet system feedback information, wherein the packet system feedback information is for available bit rate traffic; and wherein generating the first schedule comprises generating the first schedule in response to the packet system feedback information;

generating the packet schedule comprises generating the packet schedule in response to the packet system feedback information;

selecting the next first-set tunnel identifier comprises selecting the next first-set tunnel identifier based on the next second-set tunnel identifier;

wherein the first-set tunnel information indicates new first-set tunnels and first-set transmission results;

wherein the packet system feedback information is for available bit rate traffic;

wherein receiving and distributing the packet system feedback information comprises processing tunnel resource management cells for ABR tunnels;

generating the second schedule comprises generating the second schedule in response to the packet system feedback information;

generating the first schedule comprises generating the first schedule in response to the packet system feedback information; and generating the packet schedule comprises generating the packet schedule in response to the packet system feedback information.

12. The method of claim 11 wherein the packet system feedback information is for available bit rate traffic.

13. The method of claim 12 wherein receiving and distributing the packet system feedback information comprises processing tunnel resource management cells for ABR tunnels.

14. The method of claim 11 further comprising:

generating third-set information in response to the second-set information;

generating a third schedule for a third set of tunnels in response to the third-set information;

selecting a next third-set tunnel identifier based on the third schedule; and wherein selecting the next second-set tunnel identifier comprises selecting the next second-set tunnel identifier based on the next third-set tunnel identifier.

15. The method of claim 14 wherein the third-set information indicates new third-set tunnels and third-set transmission results.

16. The method of claim 14 wherein the third set of tunnels includes a constant bit-rate tunnel, a variable bit rate tunnel, and an available bit rate tunnel.

17. The method of claim 16 wherein the first set of tunnels includes an unspecified bit-rate tunnel and a guaranteed flat rate tunnel.

18. The method of claim 14 further comprising:

receiving and distributing the packet system feedback information; and wherein generating the third schedule comprises generating the third schedule in response to the packet system feedback information;

generating the second schedule comprises generating the second schedule in response to the packet system feedback information;

generating the first schedule comprises generating the first schedule in response to the packet system feedback information; and generating the packet schedule comprises generating the packet schedule in response to the packet system feedback information.

19. The method of claim 18 wherein the packet system feedback information is for available bit rate traffic.

20. The method of claim 19 wherein receiving and distributing the packet system feedback information comprises processing tunnel resource management cells for ABR tunnels.

* * * * *

UNITED STATES PATENT AND TRADEMARK OFFICE
CERTIFICATE OF CORRECTION

PATENT NO. : 6,765,915 B1  Page 1 of 1
DATED : July 20, 2004
INVENTOR(S) : Michael M. Metzger et al.

It is certified that error appears in the above-identified patent and that said Letters Patent is hereby corrected as shown below:

<u>Title page,</u>
Item [73], Assignee, should read -- Mindspeed Technologies, Inc., --.

Signed and Sealed this

Fourteenth Day of September, 2004

JON W. DUDAS
*Director of the United States Patent and Trademark Office*